United States Patent [19]

Mouri et al.

[11] Patent Number: 4,680,929
[45] Date of Patent: Jul. 21, 1987

[54] SWIVELLING WORKING VEHICLE

[75] Inventors: Akihiko Mouri, Sakai; Kazushige Ikeda, Osaka, both of Japan

[73] Assignee: Kubota, Ltd., Osaka, Japan

[21] Appl. No.: 561,440

[22] Filed: Dec. 14, 1983

[30] Foreign Application Priority Data

Apr. 4, 1983 [JP] Japan ............................. 58-49852[U]
Jul. 21, 1983 [JP] Japan ............................... 58-134987

[51] Int. Cl.⁴ ............................................ F16D 31/00
[52] U.S. Cl. ...................................... 60/368; 60/390; 60/392; 60/395
[58] Field of Search ................ 60/368, 390, 392, 395, 60/463, 468, 469, 494; 212/162, 245, 247; 172/2, 3; 414/699

[56] References Cited

U.S. PATENT DOCUMENTS

| | | | |
|---|---|---|---|
| 2,955,210 | 10/1960 | Dean et al. | 60/468 |
| 3,055,180 | 9/1962 | Kane | 60/390 |
| 3,490,606 | 1/1970 | Gordon | 212/245 |
| 3,739,652 | 6/1973 | Caldwell et al. | 212/247 |
| 3,760,591 | 9/1973 | Gordon | 60/911 |
| 4,399,653 | 8/1983 | Pylat, Jr. | 60/368 |

FOREIGN PATENT DOCUMENTS 2022745 11/1971 Fed. Rep. of Germany ...... 212/147

*Primary Examiner*—Edward K. Look
*Attorney, Agent, or Firm*—Edwin E. Greigg

[57] ABSTRACT

A working vehicle having a working device mounted on a swivel base rotated by a hydraulic motor. There is provided a control system which causes the swivel base to start and stop smoothly at highest possible standard speeds which are preset for an entire swivelling range.

5 Claims, 7 Drawing Figures

SWIVELLING WORKING VEHICLE

RELATED INVENTION

This application is copending with application Ser. No. 563,917 filed Dec. 21, 1983, now U.S. Pat. No. 4,552,503.

BACKGROUND OF THE INVENTION

1. Field of the Invention

The present invention relates to a swivelling working vehicle which comprises a swivel base equipped with a working device, a hydraulic motor causing the swivel base to rotate, and an actuator valve adapted to drive the hydraulic motor in forward and reverse directions or to stop said motor. More particularly, the invention relates to a swivelling working vehicle which besides the above members further comprises a setting adjustor for predetermining rest or stoppage positions of the swivel base, flow control valve means for controlling flow rate of oil delivered to the hydraulic motor and an electric control circuit which automatically controls the actuator valve and the control valve means on the basis of signals generated by and delivered from a sensor and a detector, the sensor adapted to measure an angular position of the swivel base with respect to the vehicle body while the detector being adapted to sense a shifted state of the actuator valve. In other words, the invention relates to a working vehicle having a structure such that a control of swivelling motion of the swivel base is simplified so as to improve a working efficiency of the vehicle comprising a swivel base operated by means of a hydraulic motor.

2. Description of the Prior Art

It is already known to provide a swivelling working vehicle with a control device which is designed merely to automatically stop a swivel base by means of an actuator valve and flow control valve means in such a manner that said swivel base is caused to stop smoothly without any violent shock.

The known vehicle is however disadvantageous in that the swivel base is abruptly accelerated to start its swiveling motion. Such a violent start of said motion brings about many problems such as dropping down of loaded material and a change in attitude or position of the vehicle body due to a reaction caused by the abrupt start. This makes it uncomfortable for an operator to drive the vehicle. Moreover, the swivelling speed varies remarkably when said vehicle is located on a slope where an inertia of swivelling members will be undesirably increased or decreased. Consequently, the swivel base cannot be stopped exactly at a predetermined angle, thus resulting in a lowering of working efficiency. It has therefore been desired to improve the automatic control of the swivel base.

SUMMARY OF THE INVENTION

In view of the above, the invention aims at an improvement in the automatic control of swivel base.

For this purpose, it is an object of the invention to provide a control system such that a swivel base can be rotated at a series of the highest possible speeds each predetermined for each section of an entire angular range of swivelling motion in such a manner that said base can smoothly start to swivel and accurately stop swivelling without giving rise to an untolerable shock.

According to the invention, a swivelling working vehicle is provided with a control system comprising an electric circuit adapted to store and compute the following three equations (A), (B) and (C) for each small change in an angle of the swivel base.

Namely, those are involved:

$$\dot{\theta}_\theta = \sqrt{2K_1(\theta + \delta)}, \tag{A}$$

$$\dot{\theta}_\theta = \sqrt{2K_2(\theta f - \epsilon - \theta)} \text{ and} \tag{B}$$

$$\dot{\theta}_\theta = \dot{\theta}M. \tag{C}$$

wherein $\dot{\theta}_\theta$ are standard angular speeds of the swivel base at an angle $\theta$ measured from a starting point $\theta s$, $\dot{\theta}M$ is the highest possible standard speed of said base, $\delta$ is a correction factor for setting a starting speed at the point $\theta s$, $\epsilon$ is another correction factor for setting an insensitive zone of angle preset near a stoppage position $\theta f$ of the swivel base, and $K_1$ and $K_2$ are acceleration and deceleration factors, respectively. Generally, different values $\dot{\theta}_\theta$ are obtained according to the equations (A), (B) and (C) so that one of said equations which gives the smallest standard value $\dot{\theta}_\theta$ is selected to control the actual angular speed $\dot{\theta}$ of the swivel base so as to follow said one equation on its curve with the angle $\theta$ varying continuously. The aforementioned actuator valve and flow control valve means are thus automatically operated.

The above equations give the standard angular speed of swivel base as a function of the varying angle $\theta$ measured from the starting point $\theta s$ of said base until it reaches the stoppage position $\theta f$. As shown in FIG. 3, a first curve l represents a smooth acceleration during a starting period of swivelling motion and corresponds to the firsst equation (A). A second curve m represents on the other hand a smooth deceleration effected in a braking period for stopping the swivel base and corresponds to the second equation (B). A straight line n represents a constant speed held in a middle period between the acceleration and decceleration periods and corresponds to the third equation (C), the constant speed being predetermined to be the highest possible speed $\dot{\theta}M$ suitable for an efficient and safe swinging motion of the swivel base.

The equations are stored in a memory portion of the control system prior to operation of said swivel base. All the equations are then computed one after another by a data processing unit in the system by means of angle data $\theta$ detected to be input into the control system continuously by the sensor. Three standard angular speeds $\dot{\theta}_\theta$ thus obtained are compared with each other in order to find out one of the equations which is giving the smallest value of the speed $\dot{\theta}_\theta$. One of the curves l, m or the line n which represents the selected equation is then utilized for control of the swivelling speed during one period. Namely, the actual angular speed $\dot{\theta}$ is caused to follow said one curve or line with the detected angle $\theta$ varying continuously. The actuator valve and the flow control valve means are operated in a feedback control mode so that the actual speed $\dot{\theta}$ may be always consistent with the smallest standard speed $\dot{\theta}_\theta$.

According to the invention, the actual speed $\dot{\theta}$ can surely be prevented from differring from the smallest standard speed $\dot{\theta}_\theta$ despite any disturbing factor which may arise. This is due to the abovedescribed control system in which a feedback control is employed besides the capability setting the standard speeds. Thus, optimum swivelling speeds can now be obtained automatically and securely during the acceleration period for starting of swivel motion, during the middle period of the constant speed and during the deceleration period for stopping the swivel motion.

It is therefore possible to smoothly start and stop the swivel base which is always driven at the highest possible speeds for a higher working efficiency in the invention. The dropping down of loaded material is prevented due to the shockless operation of the swivel base. Furthermore, a better comfortability for the operator as well as a higher preciseness in automatically stopping said swivel base are also achieved because any unforeseen change in the attitude or direction of the vehicle body is avoided.

Now, any irregular ground surface such as a slope will scarcely affect the accuracy in the automatic stoppage of the swivel base. The speed control effected over the entire angular range of the swivelling motion affords an easier control of the relations between various working devices and the swivel base, thus remarkably improving the functions of the working vehicle.

Other merits of the invention will become clear through the following description.

BRIEF DESCRIPTION OF THE DRAWINGS

An embodiment of the invention is illustrated in the drawings, in which.

DESCRIPTION OF THE PREFERRED EMBODIMENTS

Figure 1:
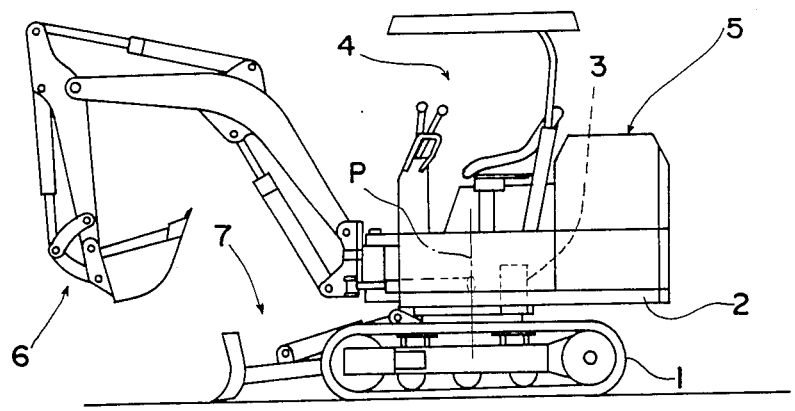
FIG. 1 is a side elevation of a working vehicle in the embodiment.

As shown in FIG. 1, a swivel base 2 is mounted on a vehicle body having right and left crawlers 1. An oil-hydraulic motor 3 drives the swivel base 2 to rotate around a vertical axis P. An engine 5 and a station 4 for an operator are mounted on the swivel base 2. A backhoe device or an excavator 6 is also carried by said base at a front end thereof, the device 6 being swingable up and down and capable of being extended and contracted. A dozer device 7 is attached to a front end of the vehicle body so as to be raised and lowered in operation.

Figure 2:
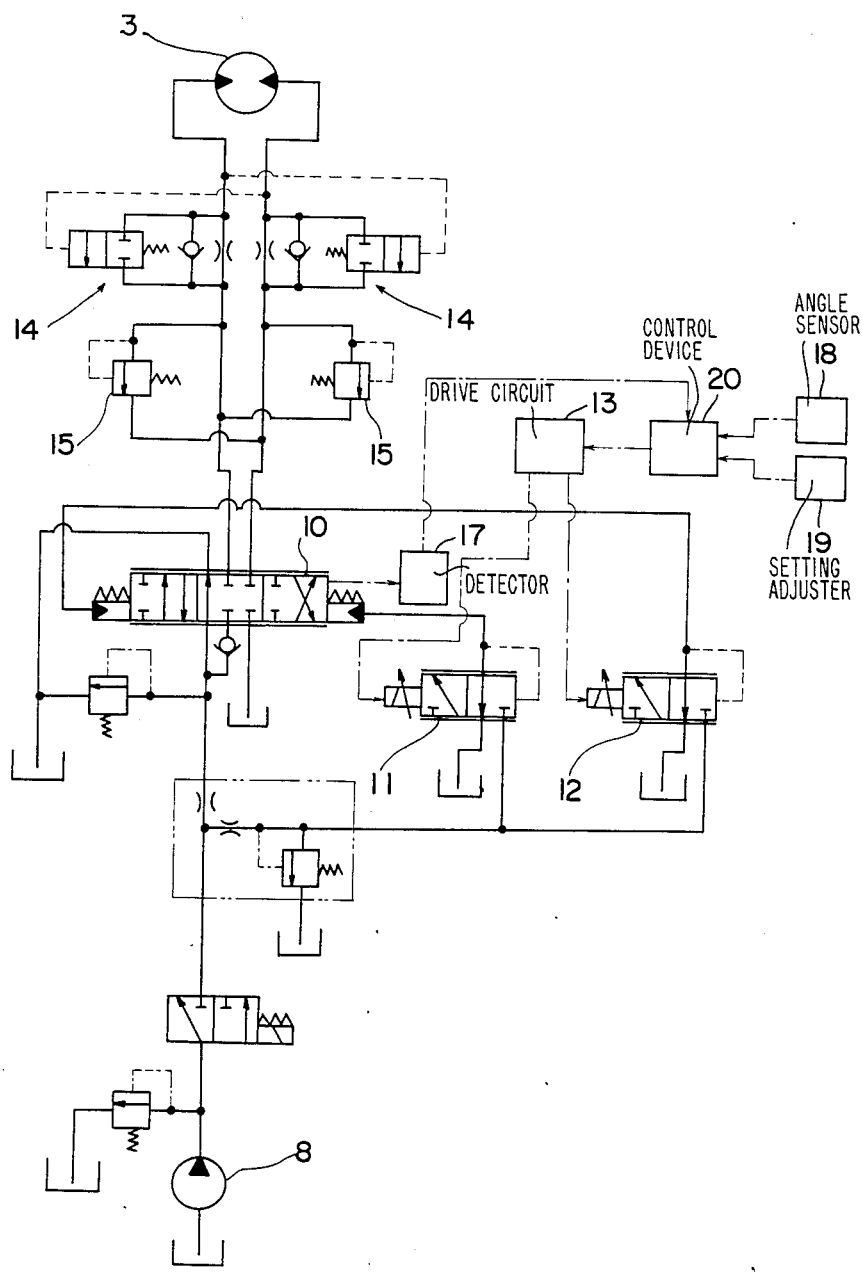
FIG. 2 shows a hydraulic circuit which drives a swivel base mounted on a vehicle body of said vehicle.
Figure 4:
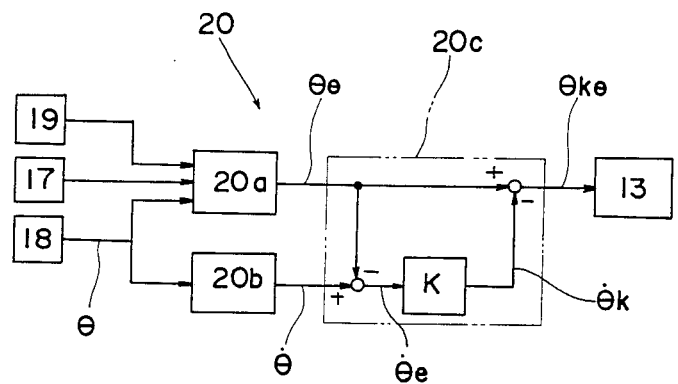
FIG. 4 illustrates schematically a control system for the control of the swivelling speed.
Figure 5:
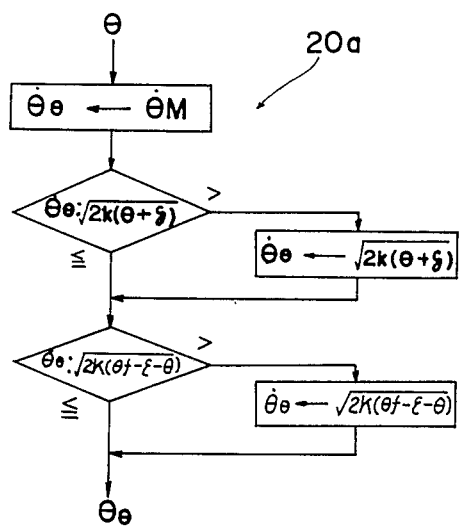
FIG. 5 is a flow chart included in the control system.

The swivel base 2 is driven by a hydraulic circuit as shown in FIG. 2. The circuit comprises the hydraulic motor 3 and a hydraulic pump 8 connected to said motor by oil passages having an actuator valve 10. This valve 10 is operated by pilot pressures so as to change over the rotating direction of the swivel base from clockwise to anticlockwise or vice versa, or to stop said swivel base 2. The actuator valve 10 has a structure adapted to function as flow control valve means which controls flow rate of oil supplied to the motor 3 in a proportional control mode.

There are provided a pair of electromagnetic valves 11 and 12 of proportional type which serve to operate the actuator valve 10 in order to change over the state thereof and to effect the control of proportional mode. A drive circuit 13 gives command signals to said electromagnetic valves to thereby cause the swivel base to rotate at controlled speeds or to stop at extreme positions.

The reference numerals 14 denote braking valve mechanism serving to prevent a momental rotation of swivel base 2 when it is to be stopped. The numerals 15 indicate relief valves cushioning the stoppage of said swivel base 2.

The drive circuit 13 can be activated in an automatic manner besides in manual manner. The automatic activation of said drive circuit will be described below in detail.

A detector 17 of limit switch type is attached to the actuator valve 10 for sensing the shifted state thereof whereas a sensor 18 of potentionmeter type is disposed on a shaft driving the swivel base 2 to rotate. The sensor 18 senses varying angle $\theta$ of the swivel base rotated clockwise or anticlockwise relative to the vehicle body. The detector 17 and sensor 18 generate data signals which are to be transmitted to a control system 20 so that the latter gives command signals to the drive circuit 13 previously activated manually. Said command signals are such that the swivel base 2 may be rotated forwards or backwards at predetermined speeds $\theta$ until it arrives at one of extreme position $\theta f$. These two end positions $\theta f$ are preset in the control system 20 by means of a setting adjuster 19 connected thereto. Thus, repeated reciprocative motions of the swivel base can be automatically effected between a digging position and an unloading position. Consequently, the excavating operation is performed more easily with a higher efficiency.

The functions of the control system 20 is further detailed below.

The following three equations (A), (B) and (C) are stored at first in a memory portion of the control system 20.

Namely, $$\dot{\theta}_\theta = \sqrt{2K_1(\theta + \delta)}, \quad (A)$$

$$\dot{\theta}_\theta = \sqrt{2K_2(\theta f - \epsilon - \theta)} \text{ and} \quad (B)$$

$$\dot{\theta}_\theta = \dot{\theta}M \quad (C)$$

are utilized wherein the values $K_1$ and $K_2$ are respectively acceleration and deceleration factors that are kept constant (for example, $K_1 = K_2 = K$ in the embodiment), the value $\delta$ is a starting speed of the swivel base, and the value $\epsilon$ is another correction factor for setting an intensitive angular zone near a stoppage position $\theta f$. The standard angular speeds $\dot{\theta}_\theta$ are computed by means of these equations as a function of the angle $\theta$ of the swivel base rotating relative to the vehicle body from a starting point $\theta s$ to the stoppage position $\theta f$.

Figure 3:
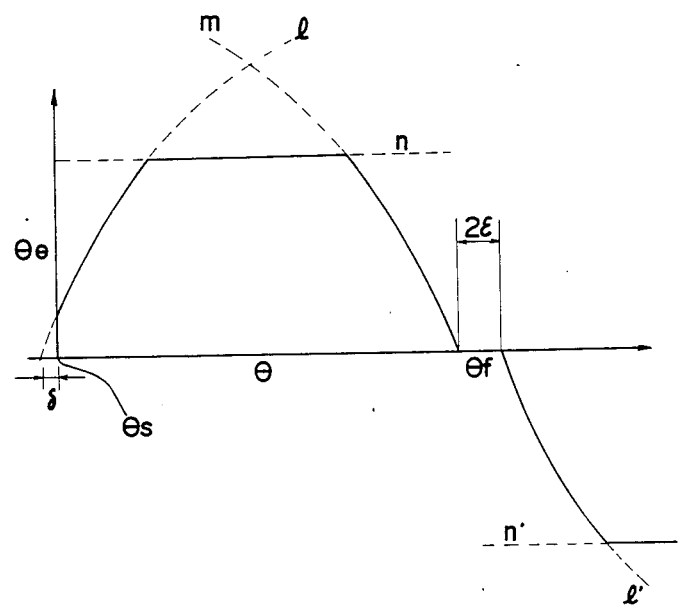
FIG. 3 is a graph showing a control of swivelling speed of said swivel base.

The first equation (A) corresponds to a curve l in FIG. 3 representing a smooth acceleration during a starting period of the swivelling motion. The second equation (B) corresponds to another curve m representing a smooth deceleration within a braking period. The third equation (C) corresponds to a straight line n representing the hightest possible standard speed $\dot{\theta}M$ between the above two periods.

On the other hand, a data signal indicative of the stoppage position $\theta f$ is given to the control system 20 from the setting adjuster 19. Further, another data signal indicative of the direction of swivelling motion will also continuously be given to said system 20 from the detector 17 attached to the actuator valve. In operation of said control system, successive data signals $\theta$ sensed by the sensor 18 and indicative of the actually rotated angle $\theta$ of the swivel base are continuously transmitted into a processing unit 20a included in the control system 20. The processing unit 20a computes the three standard speeds $\dot{\theta}_\theta$ by means of the above-described equations and utilizing the various data signals. Said unit 20a will then select the smallest standard speed $\dot{\theta}_\theta$ so as to deliver it as a command signal to a following circuit in the control system, as described hereinafter. The control system 20 also comprises a differential circuit 20b which computes actual swivelling speeds $\dot{\theta}$ on the basis of the successive data signal $\theta$ indicative of the angle of the swivel base.

The control system further comprises a correcting unit 20c which subtract each standard speed $\dot{\theta}_\theta$ from each of the actual speeds successively given by the circuit 20b. The correcting unit 20c thus generates a series of difference values $\dot{\theta}e$ each of which are then multiplied by a correction factor K stored in the unit 20c whereby a series of corrected values $\dot{\theta}K$ are generated successively. In the next stop of data processing, each of these values $\dot{\theta}k$ is subtracted from each of the standard speed $\dot{\theta}_\theta$ transmitted from the unit 20a thus generating command signals, i.e. corrected standard speed $\dot{\theta}k_\phi$. These command signals are transmitted to the aforementioned drive circuit 13.

It will now be clear that one of the equations (A), (B) or (C) which gives the smallest standard speed $\dot{\theta}_\theta$ is materialized with the detected angles $\theta$ and the actual speeds $\dot{\theta}$ and that the speeds $\dot{\theta}$ are controlled by the drive circuit 13 in a feedback control mode. As described above, the optimum acceleration, the swivelling at constant speed and the optimum deceleration are automatically and precisely effected throughout the entire swivelling range so as to drive and stop the swivel base efficiently and smoothly. It is also important in the invention that another deceleration and a constant-speed driving of the swivel base in the reverse direction are possible in case of overrunning of said base past the stoppage position $\theta f$. These additional control modes are effected in such a manner as shown with a curve l' and a straight line n' in FIG. 3. The curve l' and the line n' correspond respectively to the fourth and fifth equations (D) and (E), namely:

$$\dot{\theta}_\theta = -\sqrt{2K_3(\theta_f + \epsilon - \theta)} \text{ and} \quad (D)$$

$$\dot{\theta}_\theta = -\dot{\theta}_{M'}. \quad (E)$$

The value $-\dot{\theta}M'$ is the maximum speed in reverse rotation, and $K_3$ is another deceleration factor (for example in the embodiment, $K_3 = K_1 = K_2 = K$, $\dot{\theta}M = \dot{\theta}M'$).

The equations (D) and (E) are also stored in the memory portion of the control system 20. When an accidental overrunning takes place due to an unexpected disturbance, standard speeds $\dot{\theta}_\theta$ are calculated by means of the equations (D) and (E) so that one of said equations which gives smaller absolute value of the speeds $\dot{\theta}_\theta$ may be selected so as to be used as a criterion for control of the backward rotation. The swivel base 2 which has overrun can thus return smoothly to the preset stoppage position $\theta f$ automatically without help of a manual operation. Namely, the control system 20 activates the drive circuit 13 in the same manner as in the forward rotation on the basis of the selected equations (E) and (D) or on the basis of the equation (D).

The sensor 18 of potentiometer type and the detector 17 of limit switch type may be substituted by any other type of sensing device such as a non-contact switch. Especially, the detector 17 for sensing the state of actuator valve 10 may be substituted by an appropriate electronic circuit adapted to judge the rotational direction of the swivel base 2 by means of successive data signals generated by the sensor 18.

Further, the actuator valve 10 having two functions described above may be substituted by two valves, one of which is a value used for changing over the rotational direction of the swivel base and for stopping same, the other being a valve used only for controlling the flow rate of oil supplied to the hydraulic motor 3. The constant values or factors $K_1$, $K_2$, $K_3$, $\delta$, $\epsilon$, $\dot{\theta}M$ and $\dot{\theta}M'$ included in the equations (A) to (E) are of course adjustable.

Figure 6:
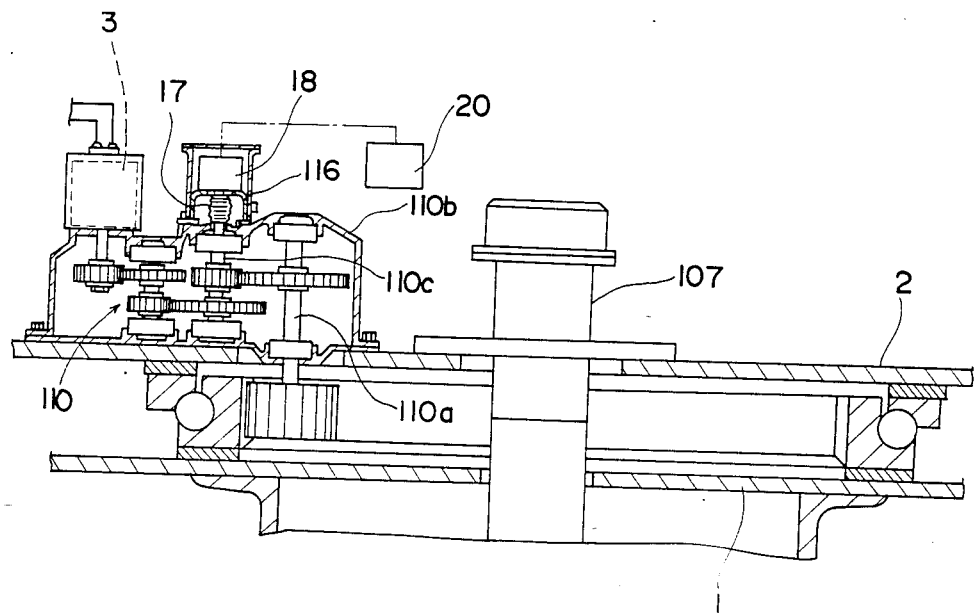
FIG. 6 is a vertical cross section of an example of a sensor accompanied by associated parts and adapted to measure an angular position of the swivel base.

An example of the sensor 18 sensing the angle of the swivel base 2 relative to the vehicle body is a rotary encoder illustrated in FIG. 6. The rotary encoder 18 is electrically connected to the control system 20 which serves as the controller adapted not only to automatically stop the swivel base 2 at a preset position, but also to indicate and control the attitude and the swivelling speed of said base relative to the crawlers 1 or the vehicle body. The rotary encoder 18 is disposed on a bracket 116 which in turn is attached to an outer surface of a casing 110b having a speed reduction apparatus 110. An end portion of an intermediate shaft 110c protrudes outwards from the casing, said shaft being located at an upstream side of an output shaft 110a in respect of the power transmission direction. The rotary encoder 18 is operatively connected to the protruding end portion of shaft 110c by a coupling 117 interposed therebetween. As seen from the drawings, the encoder 18 is activated many times per one rotation of the swivel base 2 so that the rotation angle thereof can be measured accurately. The reference numeral 107 indicates a rotary joint for feeding the oil under pressure to hydraulic motors driving the crawlers.

Figure 7:
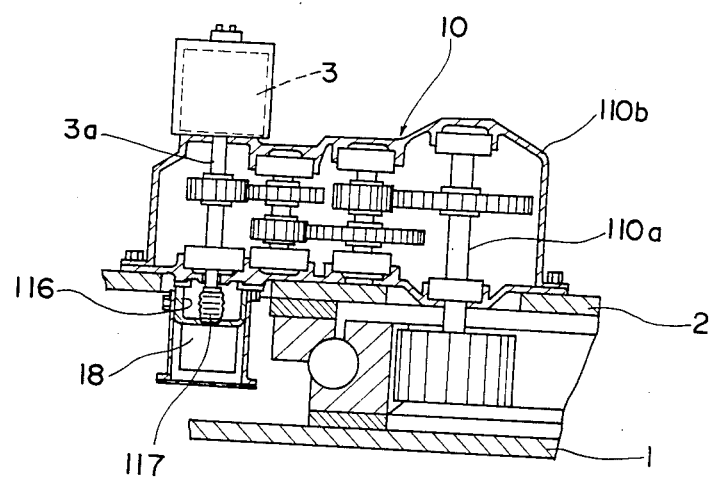
FIG. 7 is similarly a vertical cross section of another example of the sensor.

FIG. 7 shows another example of location of the rotary encoder 18. In this case, said encoder is operatively connected to an output shaft 3a of the hydraulic motor 3 driving the swivel base. It is of course possible to dispose the encoder 18 on the output shaft 110a or any shaft other than the above shafts 3a, 110c.

The structure of the reduction apparatus can be modified in any manner. Said rotary encoder may be of an optical type, magnetic type or any other type. The structure of members such as the coupling 117 may also be arbitrarily modified.

As described above, the rotary encoder used as the sensor 18 is conveniently mounted to the speed reduction apparatus by simply extending outwards one shaft thereof from the casing and by interposing a coupling between the shaft and encoder. Consequently, a small-sized cheap encoder sold at a market is available in a manner such that the ordinary function of the reduction apparatus can be made use of conveniently for sensing the angle of the swivel base. A small angle of rotation of the swivel base causes a greater rotational angle of movable members of said encoder thereby providing the sensor with a high resolving power or sensitivity despite a relatively lower resolving power of said encoder per se. In other words, the sensor can be incorporated in the working vehicle very easily at a lower cost. The rotation angle or attitude of the swivel base is thus accurately sensed so as to control the swivelling motion and the automatic stoppage of said base thereby improving the working efficiency of said vehicle.

We claim:

1. A working vehicle capable of swivelling comprising:
   a swivel base (2) having a working implement (6),
   a hydraulic motor (3) for swivelling the swivel base,
   an actuator valve (10) for controlling the hydraulic motor in opposite directions and stopping the hydraulic motor,
   an angle sensor (18) for detecting an angle of the swivel base relative to the vehicle body,
   a setting adjuster (19) for setting a stopping position ($\theta f$) of the swivel base relative to the vehicle body,
   detector means (17) for detecting operating conditions of the actuator valve,
   said actuator valve including flow control valve means for controlling flow rate of hydraulic oil supplied to the hydraulic motor,
   forward and reverse braking valves (14) which prevent a momental rotation of said swivel base when in a stationary position,
   forward and reverse relief valves (15) for cushioning said swivel base during stopping, and
   control means (20) adapted to receive signals from the angle sensor, the setting adjuster and the detector means and to transmit signals to the actuator valve and to the flow control valve to swivel the swivel base at a predetermined speed,
   said control means having a first swivel speed computing function to provide a first speed accelerated with swivelling of the swivel base,
   a second swivel speed computing function to provide a second speed decelerated as the swivel base approaches a stopping position,
   a third swivel speed computing function to provide a third, predetermined constant speed as a maximum permissible speed over an entire swivel range of the swivel base,
   a swivel speed setting function to set the slowest swivel speed at an angular position of the speeds provided by the first to third computing functions to be the swivel speed for that angular position, and
   an overrun correcting function to provide a correcting swivel speed for returning to the stopping position when an overrun of the swivelling is detected.

2. A working vehicle as defined in claim 1, further comprising a speed reduction apparatus attached to the swivel base to thereby drive said swivel base, the speed reduction apparatus having an intermediate shaft with an end portion thereof protruding outwards from a transmission casing of the apparatus, the intermediate shaft being located at an upstream side of an output shaft of the apparatus in respect of transmission direction thereof wherein a rotary encoder as the sensor is connected to a coupling to the protruding end portion of the intermediate shaft.

3. A working vehicle defined in claim 1, further comprising a speed reduction apparatus attached to the swivel base to thereby drive the swivel base, the speed reduction apparatus having an output shaft of the hydraulic motor, an end portion of the output shaft protruding outwards from a casing of the apparatus wherein a rotary encoder as the sensor is connected by a coupling to the protruding end portion of the output shaft of said hydraulic motor.

4. A working vehicle as defined in claim 1 wherein, between a swivel starting position ($\theta s$) to the stopping position ($\theta f$) of the swivel base, the first swivel speed computing function provides the first speed by a formula $\sqrt{2K_1(\theta+\delta)}$, and the second swivel speed computing function provides the second speed by a formula $\sqrt{2K_2(\theta f-\epsilon-\theta)}$, in which $\theta$ is a swivel angle of the swivel base with respect to the swivel starting position ($\theta s$), $\delta$ is a correction factor for setting a speed at the swivel starting position ($\theta s$), $\epsilon$ is a factor for setting an angular insensitivity zone adjacent the stopping psotion ($\theta f$), and $K_1$ and $K_2$ are acceleration and deceleration factors, respectively.

5. A working vehicle as defined in claim 4 wherein the overrun correcting function derives the swivel speed not exceeding the third speed from a formula $\sqrt{-2K_3(\theta f+\epsilon-\theta)}$ to correct the overrun.

* * * * *